United States Patent [19]

Long et al.

[11] Patent Number: 5,770,269

[45] Date of Patent: Jun. 23, 1998

[54] THERMAL CONTROL COATING

[75] Inventors: Lynn E. Long, Manhattan Beach; Joan L. Lum, Redondo Beach, both of Calif.

[73] Assignee: Hughes Aircraft Company, Los Angeles, Calif.

[21] Appl. No.: 717,443

[22] Filed: Sep. 20, 1996

Related U.S. Application Data

[62] Division of Ser. No. 242,201, May 13, 1994, Pat. No. 5,589,274.

[51] Int. Cl.$^6$ .................................. B05D 3/02; B05D 5/12
[52] U.S. Cl. ..................... 427/387; 427/180; 427/385.5; 427/386; 427/126.3; 524/401; 524/432; 523/135; 528/12; 528/13; 528/14
[58] Field of Search ................................. 427/387, 386, 427/385.5, 180, 218, 219, 126.3; 524/432, 401; 528/12, 13, 14; 437/235; 523/135; 106/425, 429

[56] References Cited

U.S. PATENT DOCUMENTS

| | | |
|---|---|---|
| 3,965,096 | 6/1976 | Reinisch et al. ................. 20/240 G |
| 4,039,347 | 8/1977 | Fletcher et al. ..................... 106/292 |
| 4,317,855 | 3/1982 | Guillaumon et al. ................ 428/212 |
| 4,476,155 | 10/1984 | Niemi ..................................... 427/58 |
| 4,939,031 | 7/1990 | Torre et al. ........................... 428/323 |
| 5,064,574 | 11/1991 | Oldham et al. ...................... 252/518 |
| 5,094,693 | 3/1992 | Cordaro et al. ...................... 106/425 |
| 5,215,824 | 6/1993 | Munro, III et al. ................ 428/473.5 |
| 5,312,685 | 5/1994 | Banks et al. .......................... 428/336 |
| 5,338,799 | 8/1994 | Ohsugi et al. ......................... 427/387 |
| 5,384,190 | 1/1995 | Kaburaki ............................... 428/323 |
| 5,401,573 | 3/1995 | Babel et al. ........................... 428/336 |
| 5,545,683 | 8/1996 | Okamura et al. ...................... 106/10 |

FOREIGN PATENT DOCUMENTS 0558044  2/1992  European Pat. Off. .

OTHER PUBLICATIONS

Anon., Technical Data Sheet RS 103 on "White Antistatic Paint SGC21", Feb. 1991.
Cheng Hsieh et al., "Conductive White Thermal Control Paint for Spacecraft," Proc. 38th International SAMPE Symposium, pp. 609–622, May 10–13, 1993.
J. Cordaro et al., "Molecular Engineering of Pigments for Degradation–Resistant Thermal Control Coatings", AIAA Reprint AIAA–92–2167 of Presentation at AIAA Materials Specialist Conference on Coating Technology for Aerospace Systems, pp. 85–87, Apr. 16–17, 1992.
Derwent Publication (Database WPI); AN 84–065980; JP-A-59022054 (Ricoh); 2 Feb. 1984; Abstract.
Derwent Publication (Database WPI); AN 88–224490; JP-A-63159865 (Ricoh); 2 Jul. 1988; Abstract.

*Primary Examiner*—Diana Dudash
*Attorney, Agent, or Firm*—Elizabeth E. Leitereg; Terje Gudmestad; Wanda K. Denson-Low

[57] ABSTRACT

An article includes a substrate having a thermal control coating formed of 1 part by weight of a silicone polymeric matrix having from about 3 to about 4 parts by weight aluminum-doped zinc oxide pigment particles distributed therein. The article may be either relatively thick or flexibly thin, and the coating may be greater than 0.0015 inches thick so as to have a low solar absorptance. The coating has an absorptance of about 0.2–0.3 and an emittance of about 0.9, and is sufficiently electrically conductive to dissipate electrostatic charges.

14 Claims, 1 Drawing Sheet

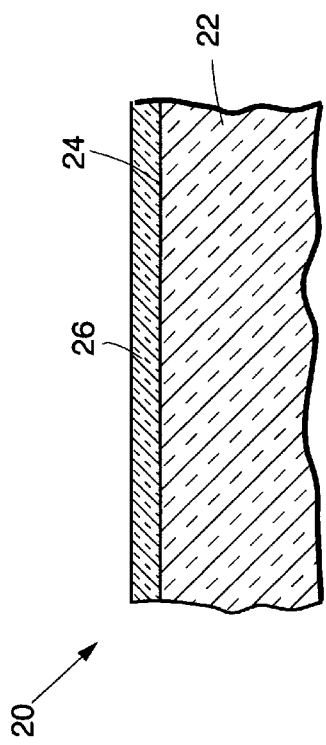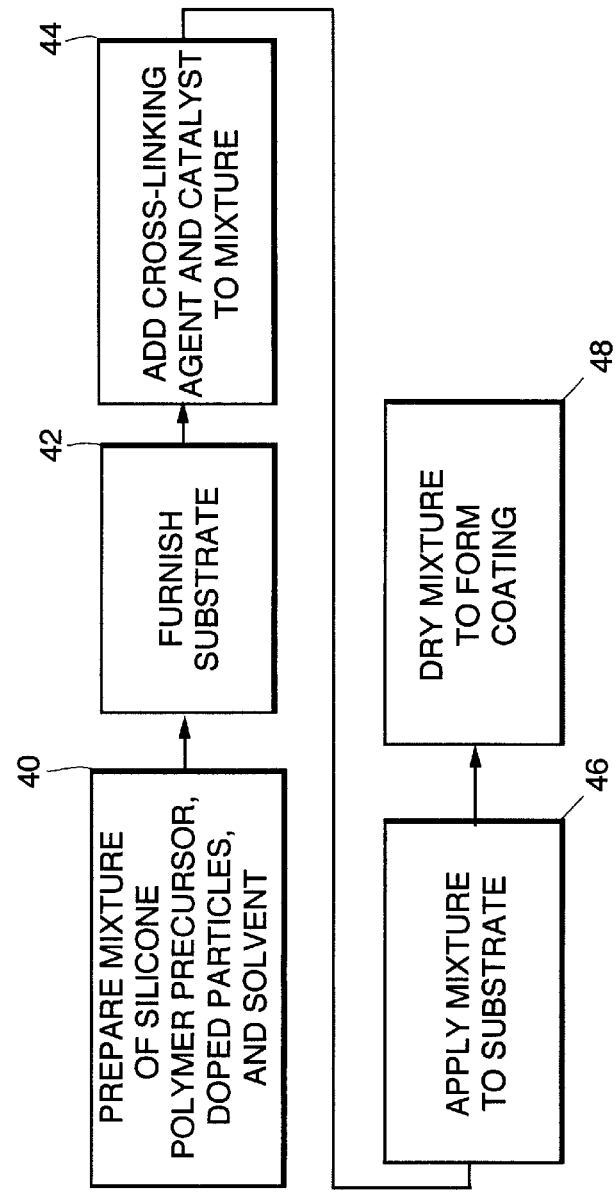

THERMAL CONTROL COATING

This is a division of application Ser. No. 08/242,201 filed May 13, 1994 U.S. Pat. No. 5,589,274.

BACKGROUND OF THE INVENTION

This invention relates to coatings applied to surfaces, and, more particularly, to a white coating that aids in controlling the surface temperature of the article to which it is applied and is also sufficiently electrically conductive to dissipate static charge.

Spacecraft such as satellites and deep-space craft are exposed to a wide range of thermal conditions. A side facing the sun is heated by the direct thermal radiation, while a side facing the void of space is cooled rapidly by radiation. Thermal control of the spacecraft is therefore important. Various techniques have been developed to maintain the interior of the spacecraft at a temperature suitable for occupancy by human beings and sensitive equipment.

In one thermal control approach, the external surface of the spacecraft is covered with a white coating that has a low solar absorptance and a high infrared emittance. The coating aids in maintaining thermal control. It must also be stable to the radiation and low-pressure gaseous environment encountered in space without losing its thermal properties by discoloring or otherwise and must be resistant to mechanical damage by micrometeorite impacts. For some applications, the coating must also be sufficiently electrically conductive to dissipate electrostatic charge on the surface of the spacecraft.

Several types of coatings are currently available to meet these various requirements. In one known type of coating, aluminum-doped zinc oxide particles are dispersed in a potassium silicate ceramic matrix that is applied to the surfaces of the spacecraft. This coating, while operable in some situations, tends to be brittle and subject to fracture during curing and handling. The zinc oxide/potassium silicate coating also cannot be applied to thin, flexible article substrates because the coating cracks when the substrate flexes.

In another approach, a two-part coating system is applied to the spacecraft surface. The base coat consists of metallic flakes in a silicone binder to provide electrical charge dissipation. The top coat includes zinc othostannate pigment in a silicon binder to produce low solar absorptance and high infrared emittance. This two-part coating is also usable in some applications, but is difficult to use and produces inconsistent results because of its complexity.

There is a need for a coating for use on spacecraft and in other thermal-control applications. Such a coating should exhibit acceptable thermal and electrical properties, and also be easy to use to produce consistent results. The present invention fulfills this need, and further provides related advantages.

SUMMARY OF THE INVENTION

This invention provides a thermal control coating, somewhat similar in nature and use to a paint. The thermal control coating has a low solar absorptance and a high infrared emittance, and is sufficiently electrically conductive to dissipate electrostatic charge that otherwise may accumulate on the surface. The coating is readily applied by spraying, brushing, dipping, or other techniques, to produce a uniform, consistent coating. The coating can be applied to thin, flexible surfaces, and the applied coating is sufficiently flexible that it does not crack even when the substrate surface is flexed by a large amount such as by folding over and creasing. The coating may be applied as a relatively thick coating layer, which aids in reaching the objective of a low surface absorptance.

In accordance with the invention, a coated article comprises a substrate having a surface and a coating on the surface of the substrate. The coating comprises a silicone polymeric matrix having doped zinc oxide pigment particles distributed therein. The zinc oxide pigment particles are doped with an element that forms shallow donorlike states in the zinc oxide. The dopant is preferably aluminum, but may also be, for example, gallium, indium, boron, zinc, tin, or hydrogen.

The substrate may be, for example, a metal or a nonmetal such as a plastic or a composite material. The substrate can be relatively thick and rigid, or thin and flexible. The silicone matrix of the coating renders the coating sufficiently flexible that it can deform by large amounts on the flexible substrate, without cracking or peeling away from the surface. The coating may also be applied to be relatively thick, at least 0.005 inches, to aid in achieving a low thermal absorptance. The doped zinc oxide particles confer low absorptance and electrical conductivity to the coating.

The present coating and its method of application provide an advance in the art of thermal control coatings, particularly for use on spacecraft. Acceptable performance is attained in a coating of low absorptance, high emittance, sufficient electrical conductivity, and good mechanical properties such as adherence and deformability. The excellent properties of the coating were retained during testing over a temperature range of from −320° F. to +400° F.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a sectional view of a portion of a substrate having a surface coated with the coating of the invention; and FIG. 2 is a block process flow diagram for the preparation and application of the coating of the invention.

DETAILED DESCRIPTION OF THE INVENTION

FIG. 1 depicts an article 20 including a substrate 22 having a surface 24. The surface 24 is covered with a coating layer 26 according to the invention. The article 20 may be made of any material that supports the coating 26, including a metal or a nonmetal such as a ceramic, a plastic, or a nonmetallic composite material. No limitation is known on the material of construction of the substrate 22. The substrate 22 may be relatively thick in the direction perpendicular to the surface 24, or it may be relatively thin. By "thick" is meant that the substrate does not substantially deform under applied bending loadings. "Thin" means that the substrate does experience substantial deformation when a bending load is applied. This distinction is important, because after application and drying many prior thermal control coatings experience brittle fracture when bent and cannot be used on "thin" materials. Although the distinction between thick and thin materials can vary according to a number of factors, for the present purposes a "thin" material has a thickness of no more than about 0.005 inches.

The coating 26 is a mixture of doped zinc oxide particles and a silicone polymeric matrix. Zinc oxide particles have a white color. It is known that the doping of the particles with elements that form shallow donorlike states aids in retaining the white color following exposure to radiation in space and also imparts sufficient electrical conductivity to allow the coating to dissipate electrostatic charges that otherwise build up on the surface 24. See J. Cordaro et al., "Molecular Engineering of Pigments for Degradation-Resistant Thermal Control Coatings," AIAA Reprint AIAA-92-2167 of Presentation at AIAA Materials Specialist Conference on Coating Technology for Aerospace Systems, Apr. 16–17, 1992. Such electrostatic charges arise from a variety of sources in a spacecraft, and unless gradually dissipated can eventually build to a high voltage whose discharge can damage electronic devices within the spacecraft.

The preferred dopant for the zinc oxide particles is aluminum, but boron, gallium, indium, zinc, tin, and/or hydrogen may also be used. In the most preferred case, the zinc oxide is doped with from about 0.35 to about 1.0 weight percent aluminum and has a particle size of about 25 micrometers. The small particle size aids in achieving a smooth consistency to the coating material in a solvent, before the coating is dried. The most preferred doped pigment material is available commercially from Union Miniere, Miniere, Belgium.

The silicone polymer matrix is preferably cross-linked and polymerized dimethyl silicone copolymer, which is flexible and resistant to degradation in ultraviolet (UV) light. The silicone polymer exhibits a good degree of deformability without cracking, both when the doped zinc oxide pigment is present at moderate levels and when it is not present. This deformability permits the final coating to deform during the bending of the substrate when a thin substrate is used. The deformability of the coating also improves the resistance of the coating to cracking as a result of impacts and the like during service, whether on a thin or thick substrate. Other flexible polymer materials may be used for the matrix, such as silicone-modified epoxy or polyurethane materials. However, experience has shown that the dimethyl silicone copolymer has the highest resistance to UV degradation, and it is therefore preferred.

The ratio of doped zinc oxide pigment preferably ranges from about 3 to about 4 parts by weight, per 1 part by weight of the dimethyl silicone polymer matrix. It is permissible to produce a coating outside these ranges, but the performance of such coatings is not as good as that of coatings within the range. If the ratio of pigment to polymer is less than about 3-to-1, the solar absorptance of the coating is greater than preferred. If the ratio of pigment to polymer is greater than about 4-to-1, there is insufficient polymer to bind the pigment together in a coherent coating. The result is a coating having reduced physical integrity, strength, and resistance to fracture.

FIG. 2 depicts a preferred process for preparing the coating material and applying the coating to the substrate. A mixture of a silicone polymer precursor, the doped zinc oxide particles, and a solvent is prepared, numeral 40. The silicone polymer precursor is a compound that can be polymerized and cross-linked to result in the silicone polymer material of the matrix. In the preferred case, the precursor is dimethyl silicone copolymer. The liquid copolymer is available commercially from NuSil Technology. The copolymer is dissolved in an appropriate solvent, in the preferred case VM&P (varnish makers and painters) naphtha solvent.

In step 40, the silicone polymer precursor, the solvent, and the doped zinc oxide particles are mixed together. In a preferred case, 100 parts by weight of dimethyl silicone copolymer, 312 parts by weight of VM&P naphtha solvent, and from 300 to 400 parts by weight of the aluminum-doped zinc oxide pigment are combined to form a precursor mixture and placed into a ceramic jar with ½ inch diameter ceramic grinding media. The jar is closed and placed onto a ball mill. Ball milling is continued for typically about 3 hours, until the pigment is ground to a Hegman grind of at least 6. If necessary, the ball mill grinding is continued until the desired grind size is reached. After ball mill grinding is complete, the precursor mixture is transferred to a glass or metal container.

The substrate 22 is supplied, numeral 42. The surface 24 of the substrate 22 is cleaned of dirt, grease, and other foreign matter by wiping with a solvent. No other special preparation of the surface, such as etching or the like, is required.

Immediately before the coating is to be accomplished, a cross-linking agent and a catalyst are added to the precursor mixture. The cross-linking agent and the catalyst are those indicated by the manufacturer as appropriate for the selected polymeric precursor. In the preferred approach, about 7.5 parts of 90 percent Silbond TNPS cross-linking agent and about 0.75 parts by weight of dibutyltin dilaurate catalyst are added to the precursor mixture, numeral 44, yielding a final mixture. The cross-linking agent increases the cross-linking density of the cured coating and makes the coating tougher. The catalyst accelerates the cross-linking process. The addition step 44 is performed immediately prior to application of the final mixture to the surface, because earlier addition of the catalyst would result in an overly thick consistency of the mixture for coating, which consistency could not be reduced through the addition of additional solvent. (The cross-linking agent could be added earlier as long as the catalyst is not added, but both are added together in the preferred embodiment, for convenience.)

Additional VM&P naphtha solvent may be added in this same step 44 to adjust the consistency of the final mixture according to the application procedure that has been selected, ambient temperature, and other conditions. For the preferred spraying application procedure, about 65 to 130 additional parts by weight of VM&P naphtha are added to reduce the viscosity of the final mixture.

The final mixture is applied to the surface 24 of the substrate 22, numeral 46. In most cases, the surface 24 is primed to improve the adherence of the mixture before the mixture is applied. Standard primers for polymeric application are available. The preferred primers are SS4044 silicone primer (available from General Electric) for metal substrates 22, and A1100 silane primer (available from Union Carbide) for plastic substrates 22. The primer is applied in the manner recommended by its supplier. For the two preferred primers, application is by spray gun with subsequent drying for one hour before the final mixture is applied.

Application of the final mixture can be accomplished by any operable technique, such as, for example, spraying, painting, dipping, etc. The amount of solvent in the final mixture is selected to be compatible with the selected application technique. The above-described formulation of the final mixture is for the preferred application approach of spraying. To accomplish the spray application, any conventional air-atomizing sprayer and its conventional spray procedure are used.

With the formulation discussed above, the spraying produces a uniform coating on the surface 24. The coating can be relatively thick or thin. As with conventional painting, however, if a thick coating is desired it is preferred to apply a succession of thinner coats over an area and to allow each thin coat to dry partially before applying the next coat. The present mixture formulation permits relatively thick coatings of more than 0.001 inches thickness to be applied. This thick coating tends to have a slightly lower solar absorptance than a thinner coating of the same material, as will be illustrated in greater detail subsequently.

The mixture applied to the surface is permitted to dry, numeral 48. After the complete coating has been applied, it is preferred to permit the coating to dry for at least 7 days in ambient air prior to use.

To test the coating of the invention, mixture material was prepared according to the preferred approach and having the preferred composition discussed previously with a ratio of 3 parts by weight of 1 weight percent aluminum-doped zinc oxide to 1 part by weight of the silicon polymer. The mixture was applied by spraying to the substrate. The substrates that were used included "thick" aluminum having a thickness of 0.032 inch and "thin" plain, unfilled, black kapton polyimide film having a thickness of 0.002 inch. Various thicknesses of coatings were prepared.

A number of tests of the coated articles were performed using standard procedures.

Outgassing was measured for both specimens to be 0.1 percent TML (total mass loss), 0.02 percent CVCM (collected volatile condensable material), and 0.01 percent WVR (water vapor recovered). These outgassing results are sufficiently low to qualify the coated articles for use in space pursuant to existing standards.

The measured solar absorptance of the coating on aluminum was 0.32 at a coating thickness of 0.0014 inch, 0.27 at a coating thickness of 0.0025 inch, and 0.25 at a coating thickness of 0.0035 inch. The measured solar absorptance of the coating on black kapton was 0.39 at a coating thickness of 0.0015 inch, 0.32 at a coating thickness of 0.0025 inch, 0.25 at a coating thickness of 0.004 inch, and 0.24 at a coating thickness of 0.005 inch. These low absorptances are acceptable and within the range of about 0.2–0.3 generally desired for space applications, particularly where the coating is made sufficiently thick. Where the coating is too thin, as less than about 0.0015 inches thick, the substrate shows through the coating and the solar absorptance is adversely affected.

The infrared emittance of the coating on aluminum was 0.88 at a coating thickness of 0.0014 inch, 0.90 at a coating thickness of 0.0025 inch, and 0.90 at a coating thickness of 0.0035 inch. The infrared emittance of the coating on black kapton was 0.89 at a coating thickness of 0.0015 inch, 0.90 at a coating thickness of 0.0025 inch, and 0.90 at a coating thickness of 0.004 inch. These high emittances are acceptable and within the range around 0.9 generally desired for space applications.

The surface resistivity of the coating on aluminum was measured as about $10^9$–$10^{10}$ ohms per square at a coating thickness of 0.0015 inch. The surface resistivity of the coating on kapton was measured as about $10^{10}$–$10^{11}$ ohms per square at a coating thickness of 0.0015 inch. These resistivities are sufficiently low to permit dissipation of electrical charge by current flow through the coating.

The coatings of the invention thus provide excellent properties and uniformity of application for a thermal control, electrical charge dissipative coating useful for space applications. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing a coated article, comprising the steps of:
    preparing a precursor mixture of
        a silicone polymeric precursor,
        doped zinc oxide pigment particles, the zinc oxide pigment particles being doped with an element that forms shallow donorlike states in the zinc oxide, and
        a solvent;
    providing a substrate having a surface;
    adding to the precursor mixture a cross-linking agent and a catalyst for the silicone polymeric precursor to form a final mixture; immediately after the step of adding,
    applying the final mixture to the surface of the substrate; and
    drying the final mixture to form a coating on the surface of the substrate to form a coated article, the coating being both white in color and electrically conductive.

2. The method of claim 1, wherein the step of preparing a precursor mixture includes the step of
    providing zinc oxide pigment particles doped with an element from the group consisting of aluminum, gallium, indium, boron, zinc, tin, and hydrogen.

3. The method of claim 1, wherein the step of providing a substrate includes the step of
    providing a flexible substrate having a thickness of less than about 0.005 inch.

4. The method of claim 1, wherein the step of applying the final mixture includes the step of
    applying a sufficient amount of the final mixture that the thickness of the coating, after the step of drying, is at least about 0.0015 inches.

5. The method of claim 1, wherein the step of providing a precursor mixture includes the step of
    providing a dimethyl silicone polymeric precursor.

6. A paint formulation, comprising:
    a liquid polymer, wherein the liquid polymer comprises a polymer selected from the group consisting of a silicone polymer, an epoxy, and a polyurethane;
    a cross-linking agent for the liquid polymer;
    a catalyst; and
    doped zinc oxide pigment particles, the zinc oxide pigment particles being doped with a dopant element that forms shallow donor-like states in the zinc oxide.

7. The paint formulation of claim 6, further comprising a liquid solvent, the polymer being dissolved in the solvent.

8. The paint formulation of claim 7, wherein the polymer is dimethyl silicone polymer and the liquid solvent is naphtha.

9. The paint formulation of claim 6, wherein the liquid polymer comprises dimethyl silicone polymer.

10. The paint formulation of claim 6, wherein the dopant element is selected from the group consisting of aluminum, gallium, indium, boron, zinc, tin and hydrogen.

11. The paint formulation of claim 6, wherein the dopant is aluminum.

12. The paint formulation of claim 6, wherein the zinc oxide pigment particles have a particle size of about 25 micrometers.

13. The paint formulation of claim 6, wherein the liquid polymer comprises a silicone polymer, and wherein the doped zinc oxide pigment particles and the silicone polymer are present in a ratio of from about 3:1 to about 4:1 parts by weight.

14. A paint formulation, comprising:

a liquid dimethyl silicone polymer; and doped zinc oxide pigment particles, the zinc oxide pigment particles being doped with an element selected from the group consisting of aluminum, gallium, indium, boron, zinc, tin, and hydrogen, wherein the doped zinc oxide pigment particles and the dimethyl silicone polymer are present in a ratio of from about 3:1 to about 4:1 parts by weight.

* * * * *